United States Patent
Eykholt et al.

(10) Patent No.: US 9,661,083 B1
(45) Date of Patent: May 23, 2017

(54) EFFICIENT NOTIFICATION PROTOCOL THROUGH FIREWALLS

(71) Applicant: Ayla Networks, Inc., Sunnyvale, CA (US)

(72) Inventors: Joseph R. Eykholt, Los Altos, CA (US); Adrian Caceres, Los Gatos, CA (US)

(73) Assignee: Ayla Networks, Inc., Sunnyvale, CA (US)

(*) Notice: Subject to any disclaimer, the term of this patent is extended or adjusted under 35 U.S.C. 154(b) by 295 days.

(21) Appl. No.: 14/308,052

(22) Filed: Jun. 18, 2014

Related U.S. Application Data

(60) Provisional application No. 61/836,549, filed on Jun. 18, 2013.

(51) Int. Cl.
*G06F 15/16* (2006.01)
*H04L 29/08* (2006.01)

(52) U.S. Cl.
CPC .................. *H04L 67/147* (2013.01)

(58) Field of Classification Search
CPC .................................... H04L 67/147
USPC ........................................... 709/232
See application file for complete search history.

(56) References Cited

U.S. PATENT DOCUMENTS

| | | | |
|---|---|---|---|
| 2007/0214256 A1* | 9/2007 | Castaneda | H04L 67/025 709/224 |
| 2007/0214273 A1* | 9/2007 | Kacker | H04L 29/12509 709/229 |
| 2013/0322438 A1* | 12/2013 | Gospodarek | H04L 63/1466 370/389 |
| 2014/0211764 A1* | 7/2014 | Sundararajan | H04W 56/0025 370/336 |

* cited by examiner

*Primary Examiner* — Vivek Srivastava
*Assistant Examiner* — Karina J Garcia-Ching
(74) *Attorney, Agent, or Firm* — Lowenstein Sandler LLP

(57) ABSTRACT

A first computing device sends a plurality of request messages to a second computing device that is outside a firewall associated with the first computing device, each request message of the plurality of request messages comprising a request for the second computing device to send a response message to the first computing device after a time period specified in the request message. The first computing device determines a timeout period of the firewall based on one or more response messages that are received responsive to the plurality of request messages. The first computing device sends or receives an additional message to or from the second computing device within the timeout period to prevent the firewall from blocking future messages from the second computing device.

20 Claims, 10 Drawing Sheets

US 9,661,083 B1

EFFICIENT NOTIFICATION PROTOCOL THROUGH FIREWALLS

RELATED APPLICATIONS

This patent application claims the benefit under 35 U.S.C. §119(e) of U.S. Provisional Application No. 61/836,549, filed Jun. 18, 2013.

BACKGROUND

In a client-server distributed computing model, workloads are divided between servers, which typically provide services, and clients, which typically use the provided services. Clients and servers typically communicate over a computer network, or over several computer networks. In some instances, the client may be behind a firewall that inhibits the server's ability to send messages to the client.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Embodiments are directed to a notification protocol that enables a server computer system on the Internet (or another public or private wide area network (WAN)) to send a message to a client system that is protected by a firewall. The message securely notifies the client of an event. The protocol maintains a path through the firewall for the notification message.

In one embodiment, a first computing device (e.g., a client) sends multiple request messages to a second computing device (e.g., a server) that is outside a firewall associated with the first computing device. Each request message is a request for the second computing device to send a response message to the first computing device after a time period specified in the request message. Different request messages may specify different time periods. The first computing device determines a timeout period of the firewall based on one or more response messages that are received responsive to the request messages. The first computing device then periodically sends keep-alive messages to the second computing device within the timeout period to prevent the firewall from blocking future messages from the second computing device. Alternatively, the second computing device may periodically send the keep-alive messages to the first computing device to prevent the firewall from blocking future messages from the second computing device.

We define a notification protocol as one which has as a primary purpose to send an event message from a service on a public network such as the Internet to a device or computing system that is protected by a firewall. The message may be sent very infrequently, e.g., after weeks or months, and the firewall would typically be configured to block all incoming traffic that is not in response to an outgoing request or other connection. A notification protocol in accordance with embodiments described herein maintains a particular flow associated with a client and a server on a flow table of the firewall, and thus enables the server to send infrequent messages to the client without interference by the firewall.

One example of a notification protocol is for a device such as a thermostat that is controllable from the Internet. The thermostat may only occasionally receive setting changes from an Internet server and may also be queried as to its status by the server. Embodiments described herein provide an efficient notification protocol that would permit the device to be controlled from the internet without having access to or making any changes to one or more firewalls that might be interposed between the device and the Internet server.

Figure 1A:
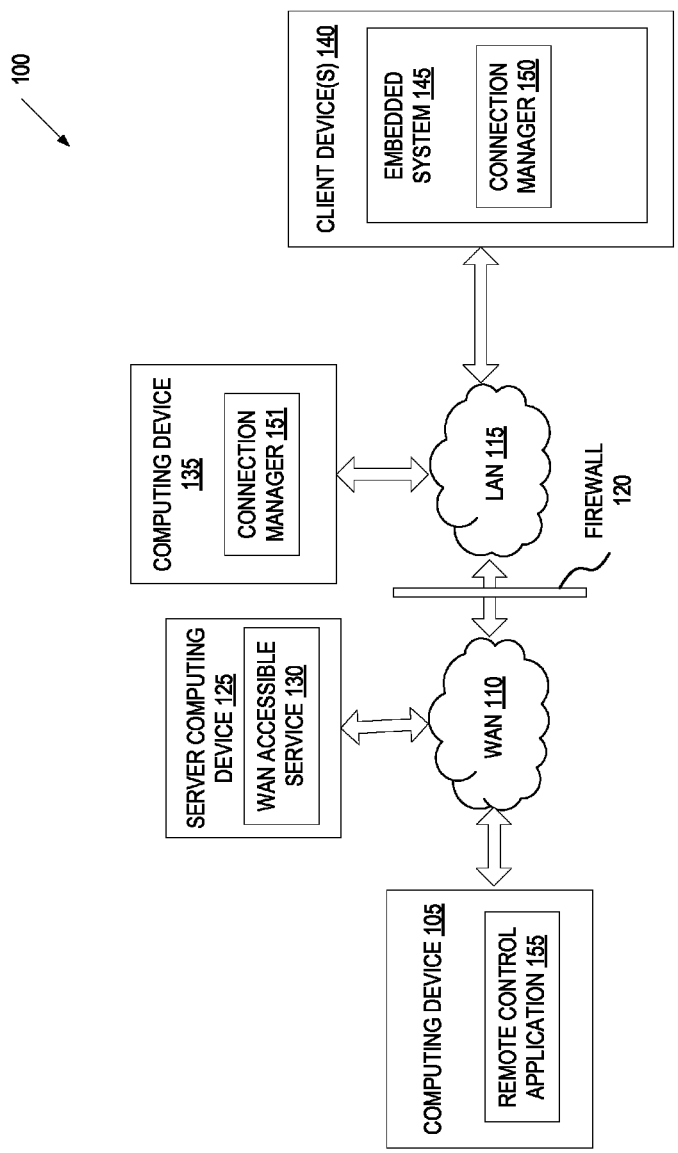
FIG. 1A illustrates one example client-server architecture, in accordance with embodiments described herein.

FIG. 1A illustrates one example client-server architecture 100, in accordance with embodiments described herein. In one embodiment, the client-server architecture 100 includes a server computing device 125 connected to one or more client devices 140 via a local area network (LAN) 115 and a connected wide area network (WAN) 110. The WAN 110 may be a public network (e.g., the Internet), a private network (e.g., an intranet), or a combination thereof.

As shown, the one or more client devices 140 are behind a firewall 120. In one embodiment, the client devices 140 are devices having embedded systems 145. Examples of such client devices 140 include electrical appliances such as refrigerators, ovens, washers, driers, dishwashers, thermostats, alarms, air conditioners, televisions, radios, receivers, amplifiers, and so forth. The devices 140 may also include consumer devices such as digital watches, music players, game consoles, digital cameras, printers, and so forth. Other examples of devices 140 include stationary devices such as HVAC systems, traffic lights, factory controllers, signs, electronic billboards, sprinkler systems, and irrigation control systems, as well as medical devices. Devices 140 may also be any other type of device that includes an embedded system 145. Alternatively, one or more client devices 140 may not include an embedded system. Examples of such devices include notebook computers, laptop computers, tablet computers, mobile phones, game consoles, smart televisions, desktop computers, server computers, and other computing devices.

An embedded system 145 is a class of computing device that is embedded into another device 140 as one component of the device 140. The device 140 typically also includes other hardware, electrical and/or mechanical components that may interface with the embedded system. Embedded systems 145 are typically configured to handle a particular task or set of tasks, for which the embedded systems 145 may be optimized. Accordingly, the embedded systems 145 may have a minimal cost and size as compared to general computing devices.

The embedded system 145 may include a communication module (not shown) that enables the embedded system 145 (and thus the device 140) to connect to the LAN 115 or to a wireless carrier network (e.g., that is implemented using various data processing equipment, communication towers, etc.). The communication module may be configured to manage security, manage sessions, manage communications with external devices, and so forth. In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology. One example of an embedded system is described in greater detail below with reference to FIG. 7.

Referring back to FIG. 1A, the LAN 115 may include a router, switch, bridge or other network device (not shown) that enables communication between multiple devices (e.g., devices 140, computing device 135, etc.) connected to the LAN 115. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 145 may not support any of the communication types supported by the network device. For example, device 140 may support only Zigbee or only Bluetooth. To enable such devices to connect to the LAN 115, the LAN 115 may include a gateway device (not shown) connected to the network device via one of the connection types supported by the network device (e.g., via Ethernet or Wi-Fi). The gateway device may additionally support other communication protocols such as Zigbee, PLC and/or Bluetooth, and may translate between supported communication protocols. Accordingly, some devices 140 may connect to the LAN 115 through the gateway device.

As described above, the LAN 115 is connected to WAN 110. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 110.

The WAN 110 may include or connect to server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a TCP connection or UDP traffic) with one or more of the embedded systems 145 (or with client devices 140 and/or other computing devices such as computing device 135). Via a session with an embedded system 145, WAN accessible service 130 may issue commands to the embedded system, send notifications to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

The notifications may be notification to establish a connection (e.g., to establish a connection using a TCP protocol). Other types of notifications may be notifications may also be sent. For example, some notification may include simple commands that will cause the embedded system 145 to perform one or more operations.

Status updates received from the embedded systems 140 may identify values or states of some or all detectable parameters of devices 140 that the embedded systems are included in. Such values or states may change based on direct user interaction with the devices. Such values or states may also change responsive to commands and/or notifications sent to the embedded systems 145 by the WAN accessible service 130 and/or by computing devices 105, 135. By maintaining sessions with the embedded systems 145, the WAN accessible service 130 may maintain up-to-date information on the states of the devices 140. Additionally, WAN accessible service 130 is able to send infrequent notifications and/or commands to the devices 140 without those notifications and/or commands being blocked by firewall 120.

In one embodiment, client-server architecture 100 includes a client computing device 105 having a remote control application 155. The remote control application 155 is configured to interface with and/or control one or more of the devices 140 via the devices' embedded systems 145. In one embodiment, the computing device 140 includes separate remote control applications for each of the embedded systems 145. Alternatively, the computing device 105 may include a single remote control application that is capable of communicating with and controlling multiple embedded systems for multiple different devices.

While computing device 105 is connected to WAN 110, remote control application 155 may establish a session with the WAN accessible service 130. The WAN accessible service 130 may provide an interface for indirectly controlling and monitoring the devices 140. If a user desires to change a state of a device, the user may issue a command via the remote control application, and that command may be sent to the WAN accessible service 130. The WAN accessible service 130 may then forward the command on to the appropriate embedded system. Additionally, when the WAN accessible service 130 receives updated state information for a device from an embedded system, the WAN accessible service 130 may forward the state information on to the remote control application. This may enable users to connect to and control the devices 140 from anywhere they have access to the Internet.

As shown, LAN 115, computing device 135 and client devices 140 are protected by firewall 120. Firewalls are commonly used to protect devices from malicious or unauthorized network traffic coming from the Internet. Firewall 120 is a networking device that only passes "safe" traffic from an outside untrusted network such as wide area network (WAN) 110 into a protected internal network such as local area network (LAN) 115. Note that there may be multiple firewalls between the client devices 140 and the untrusted WAN 110. Additionally, there may be at least one firewall (not shown) between the untrusted WAN 110 and server computing device 125 as well.

Two common protocols that may be used to transmit data include transmission control protocol (TCP) and user datagram protocol (UDP). For both TCP and UDP, the firewall 120 operates by internally maintaining a table of "flows" containing TCP connections and recent UDP traffic. A flow is a collection of information that defines a route or path between two endpoints. The two endpoints may each be identified in a flow by an internet protocol (IP) address (e.g., a source IP address and a destination IP address) and a port number (e.g., a source port number and a destination port number). The flow may additionally include information that identifies a protocol that is used to route traffic between the two endpoints (e.g., UDP or TCP). In one embodiment, a "flow" is defined as a 5-tuple of <protocol, source IP, destination IP, source port, and destination port>.

Figure 2:
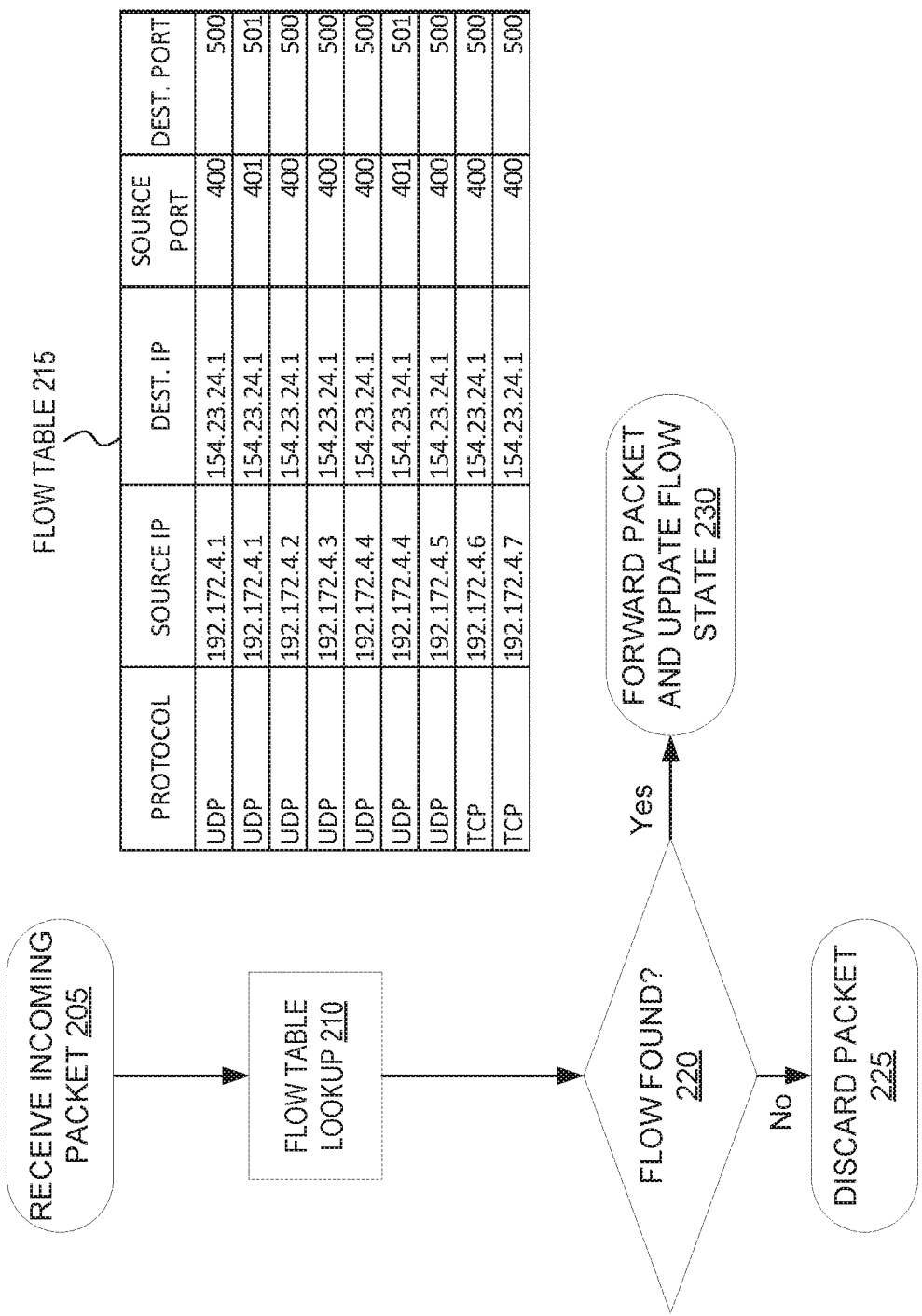
FIG. 2 illustrates application of an example flow table to filter incoming data transmissions.

FIG. 2 illustrates application of an example flow table 215 to filter incoming data transmissions. As shown in FIG. 2, an incoming untrusted network packet may be received by a firewall at block 205. At block 210, the firewall performs a flow table lookup to compare the untrusted network packet to entries in the flow table. The network packet will include a protocol, a source IP address, a destination IP address, a source port and a destination port. The firewall determines whether there is an entry in the flow table 215 that matches the protocol, source IP address, destination IP address, source port and destination port of the network packet. If at block 220 a matching flow is found in the flow table, the firewall forwards the network packet to the protected network at block 230. Otherwise, the firewall may discard the network packet at block 225. An outgoing packet is generally always forwarded, and the firewall will create a new flow table entry for an outgoing packet if a matching flow table entry does not already exist.

For TCP, the firewall also keeps state that verifies the sequence numbers and flags in transmitted packets and watches for the TCP connection to be closed by a client and a server, at which time it deletes the flow. In case the client or server is powered off or disconnected, there is a time limit (referred to herein as a TCP timeout or TCP flow timeout) after which the flow is deleted. The time limit may be fairly long, such as an hour, ninety minutes, two hours, etc. Other longer or shorter time limits may also be used. The TCP timeout may be set by an administrator to any value.

Since UDP is connectionless, and there is no explicit disconnect message, UDP flows are typically deleted if no traffic is passed in or out for them in a certain amount of time well call the UDP flow timeout or simply the UDP timeout. The UDP timeout is usually much shorter than the TCP timeout. The flow timeout may be one minute, two minutes, five minutes, ten minutes, etc. Other longer or shorter flow timeout periods may also be used by the firewall. The UDP timeout may be set by an administrator to any value.

Note that different types of firewalls in different settings may apply different TCP and UDP flow timeouts than the examples provided above. For example, the flow timeouts applied by wireless carriers (e.g., Verizon®, Sprint®, T-Mobile®, etc.) may be very different from the UDP and TCP flow timeouts applied by home network firewalls and enterprise firewalls.

TCP and UDP are the main protocols recognized by firewalls, and are the two protocols that will be discussed in embodiments herein. However, other protocols (e.g., Internet control message protocol (ICMP)) may also be used in embodiments.

The type of firewall 120 is chosen and configured by others, and there may be multiple firewalls. This makes it highly desirable or practically necessary to deal with whatever firewalls might be present. It may be impractical or not possible to gain access to the firewall settings to determine the UDP and/or TCP flow timeouts of one or more firewalls that are interposed between a device inside a protected LAN and a device outside the protected LAN. Embodiments discussed herein provide an accurate technique for identifying the flow timeouts of one or more firewalls, and then adjusting a messaging frequency in accordance with the discovered flow timeouts.

Referring back to FIG. 1A, as mentioned the server computing device 125 includes a WAN accessible service 130 that communicates with one or more embedded systems 145 and/or a computing device 135. However, firewall 120 may block transmissions from the WAN accessible service 230 to the computing device 135 or the embedded systems 145 unless there is an entry in a flow table of the firewall 120 corresponding to a connection between the WAN accessible service 130 and the computing device 135 and/or embedded systems 145.

In some applications, a protected client host (e.g., the computing device 135 or embedded system 145) waits for an incoming packet from WAN accessible service 130. This packet may arrive after a time much longer than a UDP or TCP flow timeout. It could be a very infrequent notification of some event, such as when to turn on a remote controlled device. The notifications may be days or even weeks apart. Since the notification is coming from the untrusted network, the firewall 120 would not normally allow the server to connect to the client when the notification occurs.

Network firewalls (e.g., firewall 120) are usually configured to forward an external UDP packet or TCP packet to a protected network host computer (e.g., computing device 135 or embedded system 145) when that packet is in response to a recent outgoing UDP packet or is associated with an existing TCP connection associated with a TCP flow. The definition of "recent" varies from firewall to firewall over a wide range, and is based on the appropriate flow timeout. Some common flow timeout ranges are from about 10 seconds to a lot more than 90 seconds.

It would theoretically be possible to configure firewall 120 to always accept UDP packets or TCP packets from the WAN accessible service 130, but the administration of firewall 120 is not convenient and is not always possible. Another approach is to send periodic UDP traffic or TCP traffic to the WAN accessible service 130 (or other external system), in order to be sure there is a flow established on the firewall to match an incoming UDP packet or TCP packet when it arrives. To do this efficiently, we would like to know the maximum period permitted: the UDP and/or TCP flow timeout.

Accordingly, the computing device 135 and embedded systems 145 may each include connection managers 150, 151 that ensure that firewall 120 will not block incoming transmissions from the WAN accessible service 130. The connection manager 150, 151 is responsible for maintaining a session with the WAN accessible service 130 to enable the embedded systems 145 and/or computing device 135 to receive infrequent notifications and/or instructions.

One solution is for connection manager 150 to maintain a persistent TCP connection initiated by the client device 140 to the server computing device 125. The client device 140 can send TCP keep-alive packets or other messages to maintain the connection. To maintain a TCP connection, the server computing device 125 allocated memory resources for the connection. This has the disadvantage that it ties up a lot of memory and CPU resources on the server when multiple TCP connections are maintained, which should be capable of serving a large number of clients in a cost efficient manner. In such an embodiment, it is still desirable to determine the TCP flow timeout to minimize the number of TCP keep-alive packets or other messages (e.g., keep-alive messages and/or probe messages) that are sent.

Another solution is to send an outgoing UDP packet fairly frequently in the hopes that the firewall is configured for a longer timeout. Such outgoing UDP packets may be keep-alive messages, probe messages, notifications, or other types of messages. In such an instance, knowing the UDP flow timeout allows the computing device 135 and/or embedded system 145 to minimize its outgoing traffic and thus minimize its impact on LAN 115, an uplink, and device power consumption. The server overhead at the server computing device 125 is also minimized.

In one embodiment the connection manager 150, 151 discovers the firewall flow time limit (also referred to as a flow timeout) for TCP flows and/or for UDP flows. The connection manager 150, 151 then periodically sends messages to the WAN accessible service using a particular flow (e.g., a particular protocol, source IP, destination IP, source port and destination port) within the flow timeout. In one embodiment, the time used is slightly less than the flow timeout, to compensate for any timing errors. Therefore, at any time the WAN accessible service 130 may send a notification or other message to the embedded system 145 or computing device 135 using that same flow.

In one embodiment the connection manager initially attempts to determine the UDP flow timeout and keep a UDP flow present in the flow table of the firewall 120 by sending periodic messages. However, in some instances a firewall may block all incoming and/or outgoing UDP traffic. Accordingly, if the connection manager 150, 151 fails to receive any response messages from the WAN accessible service 130 while trying to identify the UDP flow timeout, the connection manager 150 may attempt to connect to the WAN accessible service using TCP. In such an instance, the connection manager 150 would determine the TCP flow timeout, and then send periodic TCP messages to the WAN accessible service.

In one embodiment, connection manager 150 discovers a UDP timeout and then uses a UDP flow for notifications by the server computing device 125. Connection manager 150 may then establish TCP connections as necessary for data transfers. UDP scales better on the server than TCP because the server does not need to maintain separate network connection state for each client. With TCP, the server computing device 125 maintains a connection state in memory, which consumes memory resources. In contrast, UDP does not cause a connection state to be maintained, and thus does not typically consume memory resources.

Figure 1B:
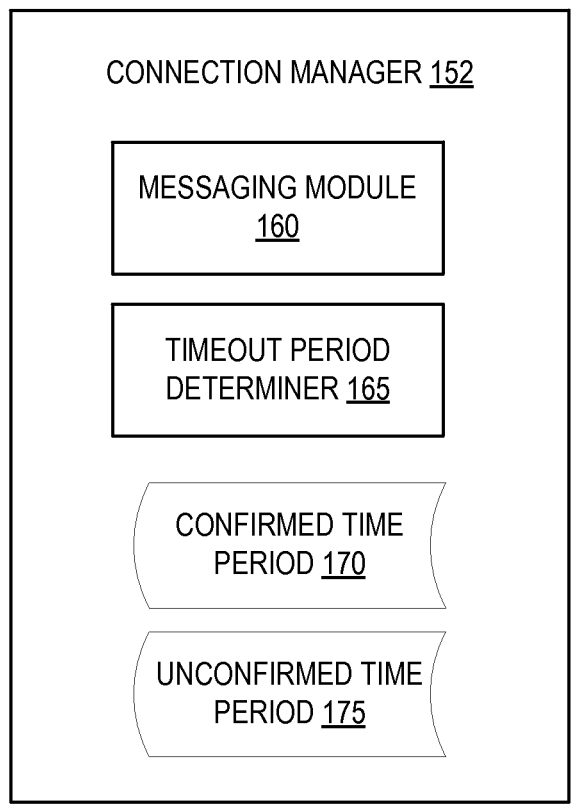
FIG. 1B illustrates a block diagram of a connection manager, in accordance with one embodiment.

FIG. 1B illustrates a block diagram of a connection manager 152, in accordance with one embodiment. Connection manager 152 may correspond to connection manager 150 and/or connection manager 151 of FIG. 1A. In one embodiment, connection manager 152 includes a messaging module 160 and a timeout period determiner 165.

Messaging module 160 is configured to send one or more messages to a WAN accessible service or other computing device that is external to a local protected network.

In one embodiment, messaging module 160 sends and receives messages in accordance with a notification protocol. The notification protocol may be built up from UDP message packets and/or TCP message packets called notification packets. In one embodiment, each notification packet contains an operation code number (opcode) indicating its meaning. Each opcode may have a request and a response type. In one embodiment, the message opcodes are: register, unregister, request probe, probe, keep-alive, and notify.

The register request message establishes whether a server recognizes a device and obtains a shorter temporary lookup index for the device that can be used by all the subsequent messages to make a server action more efficient. For registration, the server may take a long device name of up to approximately 20 characters and return a 4 byte number that the server can use to quickly find a current state for the device.

The request probe messages and probe messages are used in determining the UDP or TCP timeout value, as specified below. The keep-alive messages are messages sent by the messaging module 160 periodically to keep a connection alive. Finally, the notify messages are messages sent from the server (e.g., the WAN accessible service) to notify the client (e.g., the connection manager for an embedded system or computing device) to contact the server to receive commands to provide simple commands to the client. In one embodiment, notification messages notify the client to establish a TCP connection to the server to enable the client to receive a command. Messages other than keep-alive messages are responded to by the recipient. If an expected response is not received, the sender may resend the message for a certain number of tries, to compensate for possible packet loss in the network.

Messaging module 260 may send a series of messages to a remote device or service such as the WAN accessible service to determine a flow timeout (timeout period) of a firewall interposed between a local device hosting the messaging module and the remote device or service. In one embodiment, messaging module 260 uses request probe messages or other request messages to determine the flow timeout.

Figure 3:
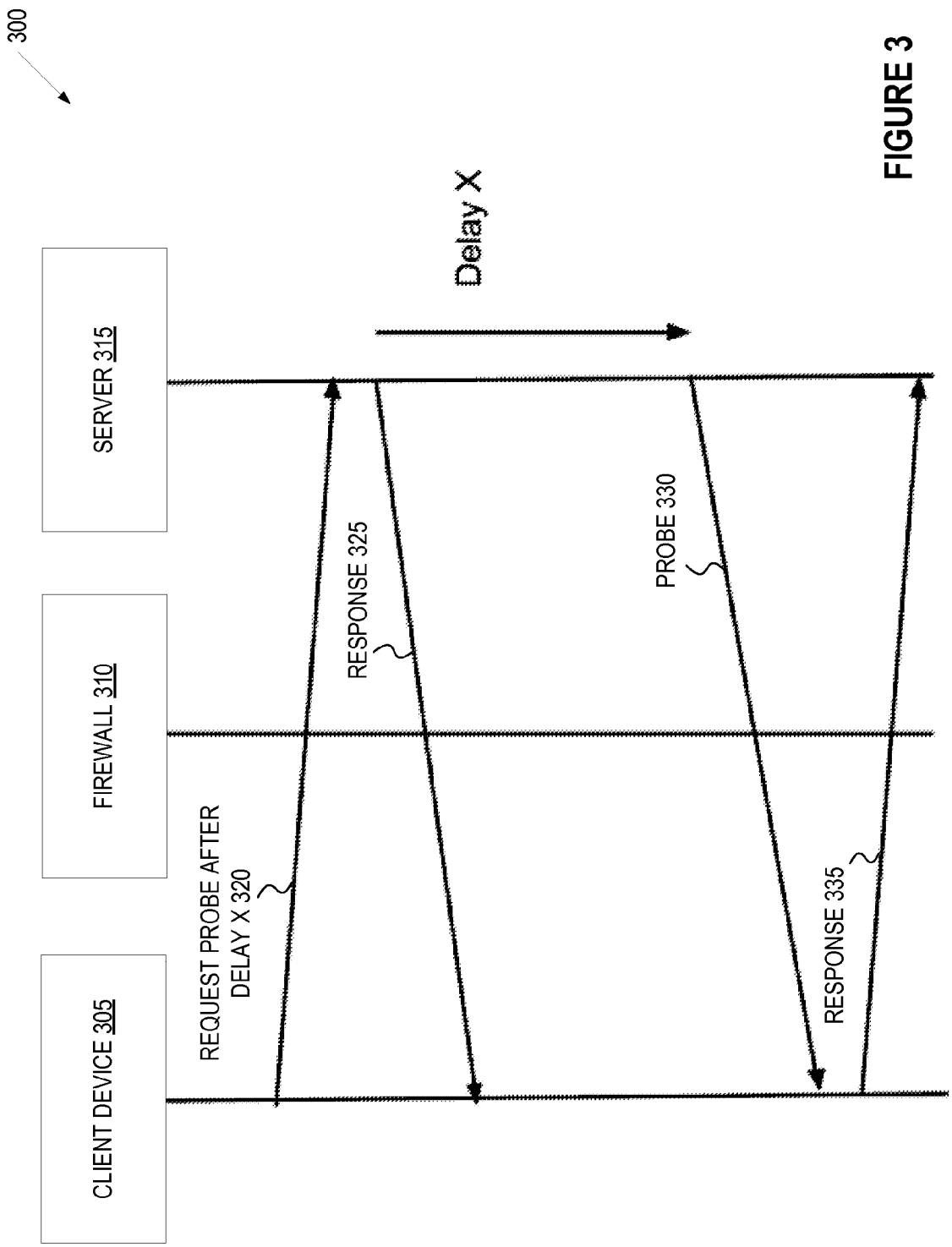
FIG. 3 is a sequence diagram showing the discovery of the UDP or TCP flow timeout of a firewall, in accordance with one embodiment.

FIG. 3 is a sequence diagram 300 showing the discovery of the UDP or TCP flow timeout of a firewall 310, in accordance with one embodiment. A client device 305 initially sends a "request probe" packet 320 to a server 315. Alternatively, the client device 305 may send another type of request message. The request probe packet 320 (or other request message) is permitted by the firewall 310, and causes a new flow to be added to the flow table of the firewall. The "request probe" packet indicates that the server should send a "probe" packet back after a specified delay, X. Alternatively, other request messages may specify that a response packet should be sent after a specified delay, X. The specified delay may be 1 second, 5 seconds, 10 seconds, 1 minute, or another interval. In one embodiment, the specified delay is based on a protocol used to send the message. For example, a larger delay may be specified for TCP than for UDP.

In one embodiment, the "request probe" packet or other transmitted request message is acknowledged by the server 315 with an initial response message 325. This response message 325 may indicate to the client device 305 that the server 315 is reachable. After the specified delay X, the server 315 sends a probe packet 330 or other response message to the client device 305. If the specified delay X is greater than a flow timeout of the firewall 310, then the firewall 310 blocks the probe packet 330. If the specified delay X is less than the flow timeout, then the firewall 310 permits the probe packet 330 to be sent to client device 305. Responsive to receiving the probe packet 330, client device 305 determines that the flow timeout of the firewall 310 is greater than or equal to the delay X.

Responsive to receiving the probe packet 330, client device 305 sends a response packet 335 back to server 315. This notifies server 315 that the probe packet was received, and may be used by the server 315 to determine that the flow timeout of the firewall 310 is greater than or equal to the delay X. Alternatively, in some instances if a response other than a probe packet was received, then client device 305 may not send an outgoing response to server 315.

In one embodiment, client device 305 sends multiple request probe packets 320 to the server, all specifying the delay X. These multiple requests may be sent to different ports of the server 315 in parallel. Alternatively, these multiple requests may be sent to a single port of the server 315 in series, where client device 305 waits for at least the delay X to elapse before sending a next request probe packet. If a probe doesn't arrive after the time X has elapsed, after several tries, client device 305 and/or server 315 may conclude that the flow timeout is likely less than X. If the probe arrives reliably after several tries, the client device 305 and/or server 315 may conclude that the flow timeout is likely X or greater.

Figure 4:
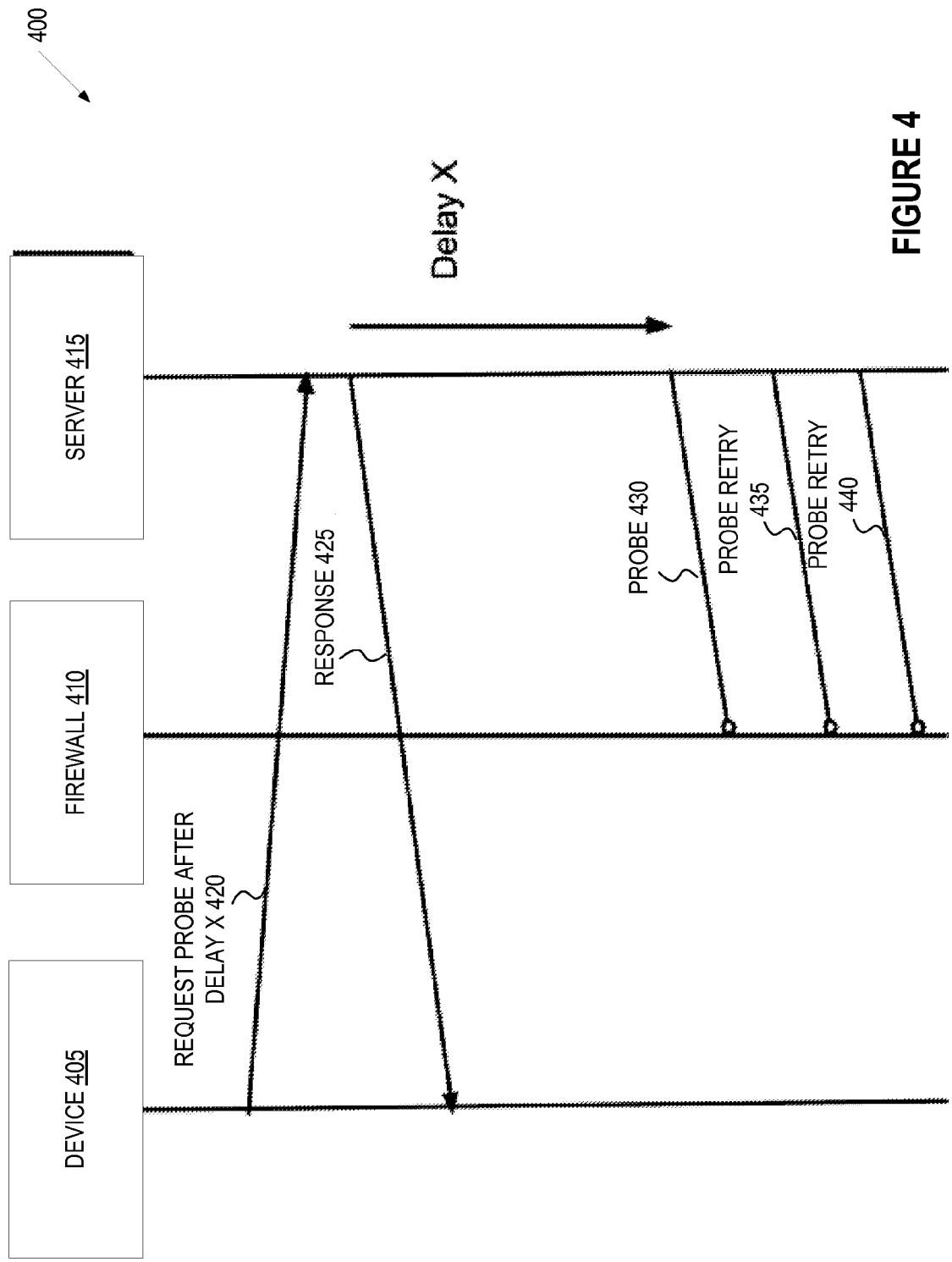
FIG. 4 illustrates another sequence diagram showing a request probe sequence in which a specified delay X is longer than the flow timeout in a firewall, in accordance with one embodiment.

FIG. 4 illustrates another sequence diagram 400 showing a request probe sequence in which a specified delay X is longer than the flow timeout in a firewall 410, in accordance with one embodiment. Similar to sequence diagram 300, in sequence diagram 400 a device 405 sends a request probe packet 420 that instructs server 415 to send a probe packet back to device 405 after a specified delay X. The server 415 immediately sends a response 425 back to device 405.

The server 415 subsequently waits the specified time period X, and sends a probe packet 430 to device 405. However, the delay X is longer than a flow timeout of the firewall 410. Accordingly, a flow for traffic between the device 405 and the server 415 has been removed from a flow table of firewall 410. The firewall 410 blocks the probe packet 430 from the server 415. The server 415, since it does not receive the expected response to the probe 430, resends the probe twice 435, 440. Alternatively, the server 415 may resend the probe greater or fewer times. The device 405 determines that the flow timeout of the firewall 410 is less than X responsive to a failure to receive the prove packets 430, 435, 440.

Returning to FIG. 1B, messaging module 160 will send out multiple requests (e.g., request probe packets) to a server. Each request may specify a different time period for the server to delay before sending a response. The response may be a probe packet if a request probe packet was sent to the server. Messaging module 160 receives one or more responses (e.g., probe packets) from the server after different specified time periods. Timeout period determiner 165 then determines a flow timeout of a firewall based on the responses and the specified delays associated with the responses.

In one embodiment, a binary search is used. The messaging module 160 picks an initial minimum (Xmin, also referred to as a "confirmed time period" 170) and maximum (Xmax, also referred to as an "unconfirmed time period" 175) value for the delay X. For example, messaging module 160 may initially set Xmin to 5 seconds and Xmax to 600 seconds. The messaging module in one embodiment first tries a moderate value for X that is in between the default Xmin and Xmax. For example, messaging module 160 may first send out a request probe message specifying a delay of 90 seconds. Based on whether or not a response (e.g., a probe packet) is received after the initial specified delay, messaging module 160 may increase or decrease the delay and send out another request to the server. When a response is received within a specified time period, the initial or current value of Xmin is replaced by the specified time period. When no response is received within the specified time period, the initial or current value of Xmax is replaced by the specified time period.

In one embodiment, after several tries with the chosen value of X, if the tries reliably work, then Xmin (which corresponds to the confirmed time period 170) is increased to X. If some of the tries fail, then Xmax (which corresponds to the unconfirmed time period 175) is decreased to X. A new X may be chosen that is somewhere between the updated Xmin and Xmax, and the process repeats. As additional delays are attempted, the confirmed time period (Xmin) 170 should increase in value and the unconfirmed time period (Xmax) 175 should decrease in value until they have similar values (e.g., until they converge or are just a few seconds apart). At this point, timeout period determiner 165 determines an approximate flow timeout of the firewall based on the confirmed time period (Xmin) and unconfirmed time period (Xmax).

In some embodiments, a firewall may be configured to block all traffic of a particular protocol (e.g., all UDP traffic). This may be detected by messaging module 160 based on a failure to receive any response messages (e.g., initial responses or delayed responses). In other embodiments, no firewall may be present or a firewall may be configured to pass all traffic of a particular protocol. In such an instance, messaging module 160 may systematically increase the delay X specified in subsequent request messages. After a delay X that is greater than or equal to a threshold value (e.g., 1 hour) is successfully tested, timeout determiner 165 may determine that there is no firewall of that no restrictions are being placed by a firewall.

While the connection manager 152 is discovering the flow timeout of a firewall, the UDP flow associated with the connection manager 152 may be deleted when trying a value for X that is larger than the flow timeout. This means that any notifications or messages that happen during the period in which the connection manager 152 is discovering the flow timeout may be lost or delayed. This would be during the time just after a client device has started operation, and there may be an increased likelihood that the server would be sending notifications during that time.

In one embodiment, to keep an active flow on the flow table of the firewall to permit the notifications during the timeout discovery, two UDP or TCP flows are used, with each flow being associated with a different port on the server. A first flow may be maintained using the confirmed time period 170 (e.g., a low value X=Xmin). A second flow may be used for testing unconfirmed time periods 175 (e.g., larger values of X). The two flows will have similar 5-tuples, using the same IP addresses but different ports. In one embodiment, different ports are used both at the client device end and at the server end. It can be safely assumed that the firewall will have the same time limit for all flows associated with a particular protocol (e.g., for all UDP flows or for all TCP flows), especially for flows between the same two IP addresses. Therefore, by discovering the timeout for the firewall on one pair of ports, that same flow timeout may be applied to other pairs of ports and thus to other flows. As larger confirmed time periods 170 (safe values of Xmin) are determined using the "test" port, the new value of Xmin can be used immediately for the "real" UDP or TCP port.

The notification protocol may be secured using a standard encryption protocol with a pre-shared secret key. If UDP is used to determine the flow timeout and to send notifications between the client device and the server, then the key can be shared or determined between the client and the server using a separate TCP protocol. The pre-shared key may be different for each client, and may be changed anytime by the server. If the key changes, the client may receive a new key from the server using the TCP protocol.

UDP is unreliable and messages may be dropped by the network, retransmitted, or delivered out of order. This means that decryption cannot rely on the previous message having been received. Accordingly, the encryption should either use the same encryption for each packet, which isn't secure, or send a random initialization vector with each packet. The latter option is chosen in one embodiment.

An initial registration request packet may not be completely encrypted because the server should be able to identify the client in order to look up the key in order to decrypt the packet. In order to verify that the registration request is valid, a hash of the payload and the shared secret may be included as a kind of signature in the request. If the registration request is not valid, the server forms the error response by including the request as the payload but with an error indication. If the registration request is valid, the server registers the client.

In one embodiment, the keep-alive messages are not acknowledged by a response (no connection verification) unless an error is detected. Eliminating such responses reduces the load on the server. However, without further measures, the client may not be able to determine whether the server is still receiving messages. So, on an infrequent basis, a probe message may be sent instead of or in addition to a keep-alive message. The probe messages and/or keep-alive messages may be used to track connectivity of the device. If the server stops receiving keep-alive messages from a device, the server may determine that the device has lost network connectivity. Similarly, if a device fails to receive responses to prove messages, the device may determine that it has lost network connectivity. If a response to a probe message is not received in a timely manner, recovery actions may be taken by the connection manager 152.

Figure 5:
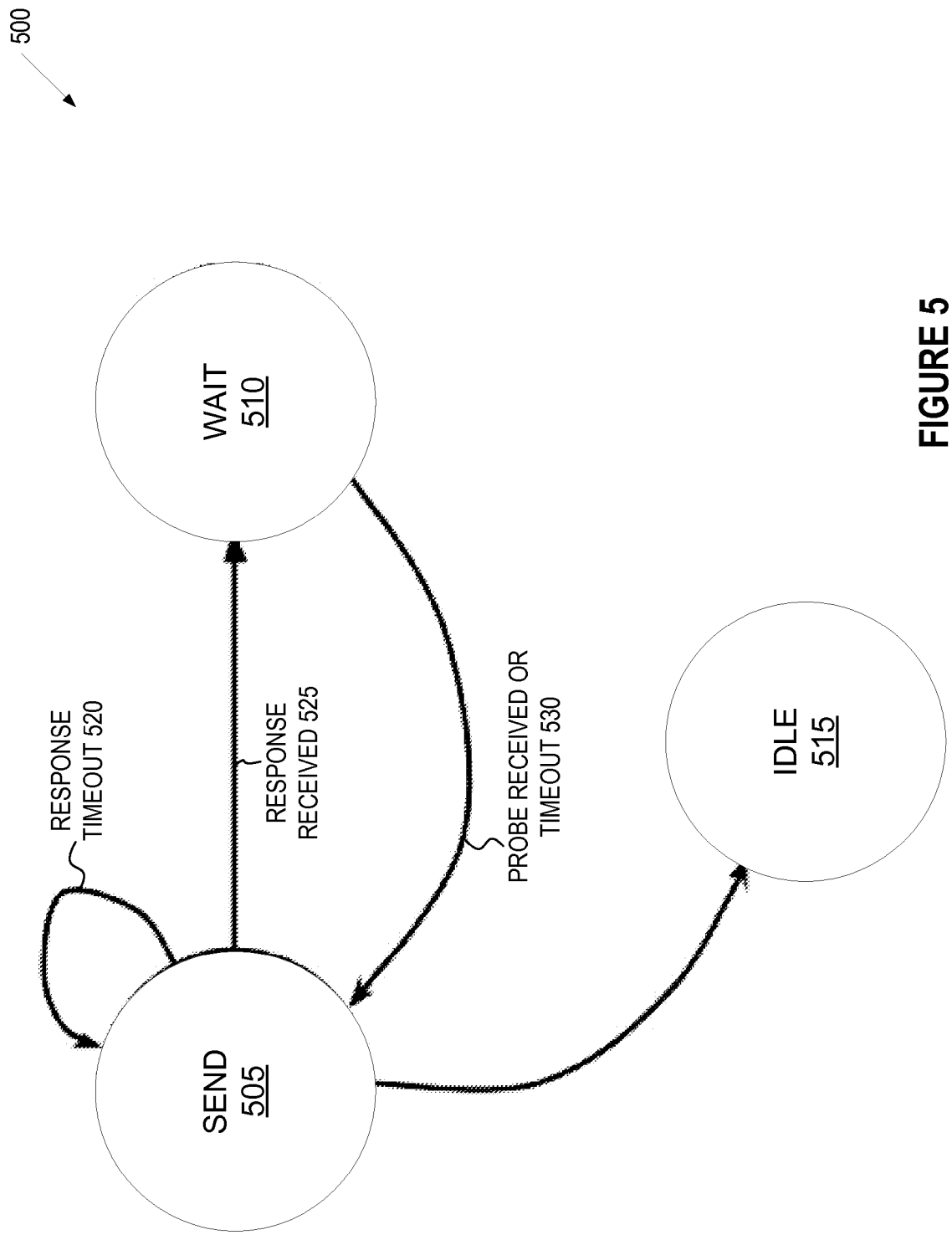
FIG. 5 illustrates a state diagram showing various states of a connection manager, in accordance with one embodiment.

FIG. 5 illustrates a state diagram 500 showing various states of a connection manager (e.g., of connection manager 152 of FIG. 1B), in accordance with one embodiment. In one embodiment, the connection manager may have a send state 505, a wait state 510 or an idle state 515. The connection manager 152 may have a send state 505 when a request (e.g., a request for probe) is sent to a server. The connection manager 505 may remain in the send state 505 until a response 525 is received from the server verifying receipt of the request or a response timeout 520 occurs. If the response timeout 520 occurs, the connection manager sends another request message to the server. Responsive to receipt of a response, the connection manager switches to the wait state 510. The connection manager may then remain in the wait state until a probe (or other delayed response message) 530 is received after a specified delay, or after a timeout occurs. Receipt of the probe, or the timeout occurring, causes the connection manager to switch to the send state 505, and thus to send another request message to the server. This process continues until the connection manager has identified a flow timeout of a firewall. Once the flow timeout is determined, the connection manager may switch to the idle state 515.

While in the idle state 515, the connection manager may periodically send keep-alive messages and/or probe messages to the server in accordance with the determined flow timeout. Alternatively, the server may periodically send keep-alive messages and/or probe messages to the connection manager in accordance with the determined flow timeout. At any time, the connection manager may receive a notification message from the server. The connection manager may then perform one or more operations in response to the notification message. For example, the connection manager may establish a TCP connection with the server if the notification message was received over UDP.

Figure 6A:
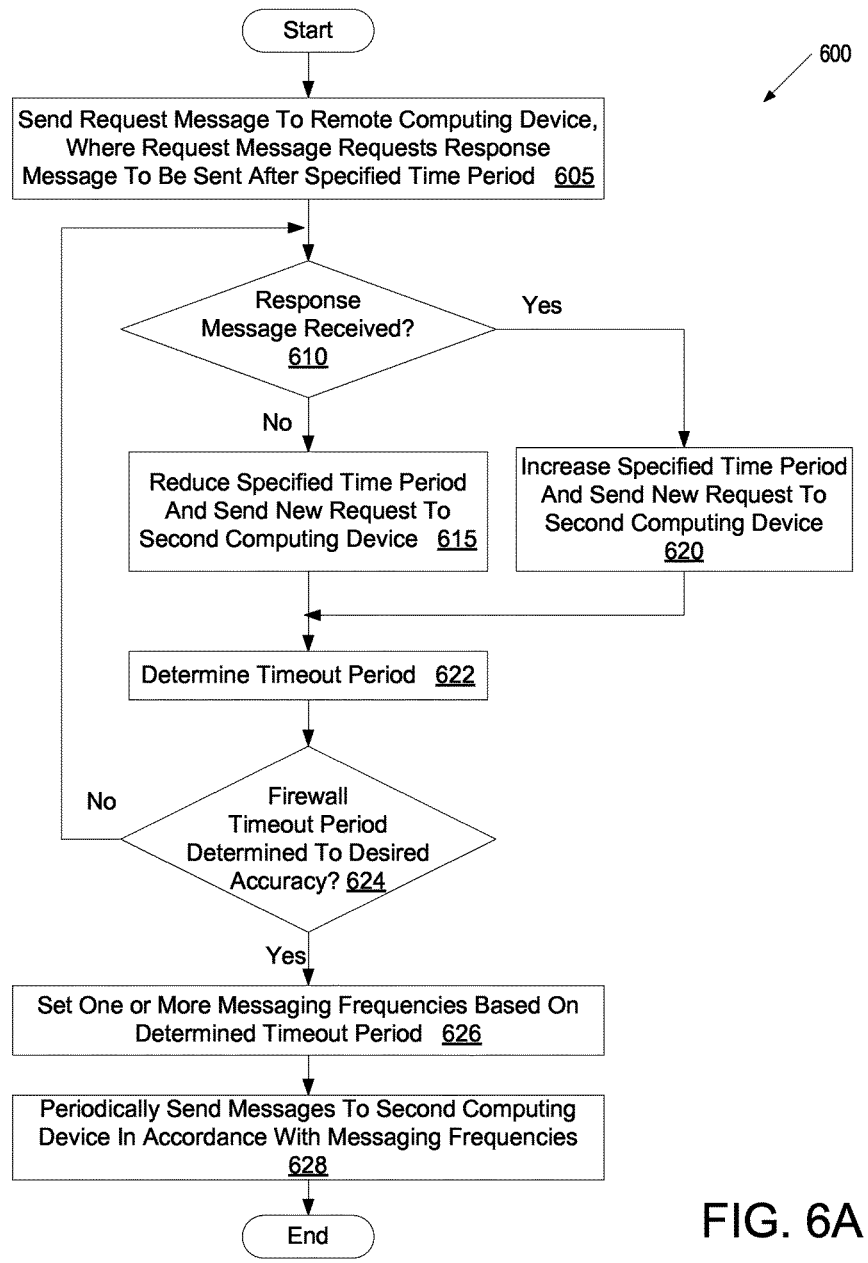
FIG. 6A is a flow diagram of an embodiment for a method 600 of maintaining an open path or route to a remote computing device.
Figure 6B:
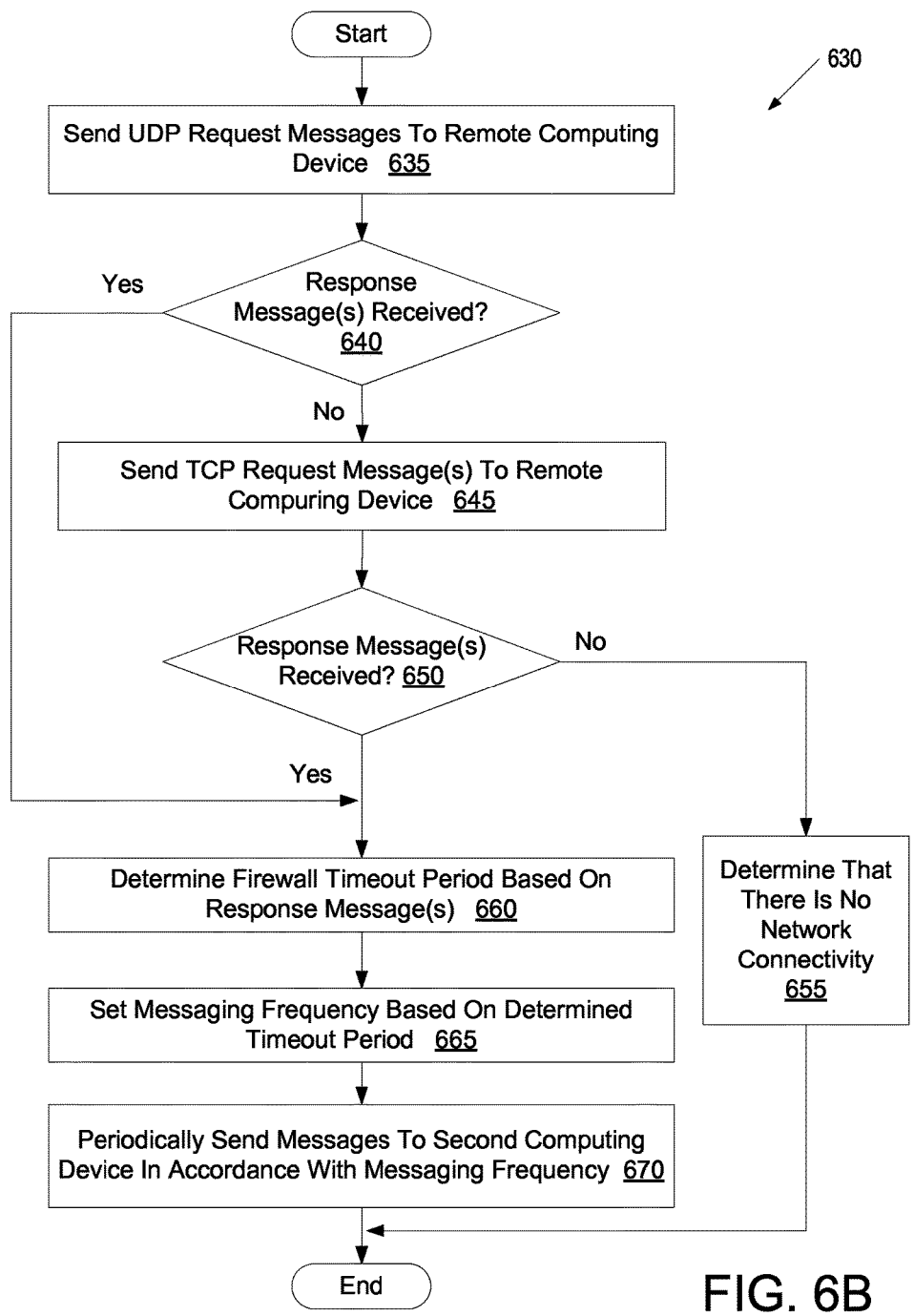
FIG. 6B is a flow diagram of another embodiment for a method 630 of maintaining an open path to a remote computing device.

FIGS. 6A-6B are flow diagrams of various embodiments of methods for determining a timeout period of a firewall and of maintaining an open path to a remote computing device. The methods are performed by processing logic that may include hardware (circuitry, dedicated logic, etc.), software (such as is run on a general purpose computer system or a dedicated machine), firmware, or some combination thereof. In one implementation, the methods may be performed by an embedded system 145 of FIG. 1. In another implementation, the methods may be performed by a computing device 135 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 6A is a flow diagram of an embodiment for a method 600 of maintaining an open path or route to a remote computing device. Method 600 may enable UDP traffic, TCP traffic, or traffic using another protocol to be transmitted in spite of any number of firewalls without unknown flow timeouts interposed between a local computing device on which processing logic runs and the remote computing device.

At block 605 of method 600, processing logic sends a request message to a remote computing device, where the request message requests that a response message be sent back after a specified time period. In one embodiment, processing logic sends a request probe packet to the remote computing device.

At block 610, processing logic determines whether a response has been received after the specified time period. If the request was a request probe packet, then a received response may be a probe packet. In such an instance, processing logic would respond to the probe packet with a response packet. If at block 610 no response message is received after the specified time period, the method continues to block 615. If a response message is received, the method proceeds to block 620.

At block 615, processing logic reduces the specified time period and sends a new request to the second computing device. The new request is a request for the remote computing device to send a response (e.g., a probe packet) back after the reduced time period.

At block 620, processing logic increases the specified time period and sends a new request to the second computing device. The new request is a request for the remote computing device to send a response (e.g., a probe packet) back after the increased time period.

At block 622, processing logic determines or estimates a timeout period (also referred to as a flow timeout). Processing logic may determine a timeout period for a firewall based on one or more responses to sent request messages. The more request messages that are sent, and the more specified time periods that are tested, the more accurate the determination of the timeout period. The timeout period may be a range between a highest confirmed time period and a lowest unconfirmed time period. A confirmed time period is a time period associated with a request message that received a successful response. An unconfirmed time period is a time period associated with a request message that did not receive a successful response.

At block 624, processing logic determines whether a firewall timeout period has been determined to a desired level of accuracy. For example, if the highest confirmed timeout period is 60 seconds and the lowest unconfirmed timeout period is 90 seconds, then processing logic may determine that the timeout period is 75 seconds plus or minus 15 seconds. On the other hand, if the highest confirmed timeout period is 60 seconds and the lowest unconfirmed timeout period is 62 seconds, then processing logic may determine that the timeout period is 61 seconds plus or minus one second. If the timeout period has not been determined to a desired level of accuracy (or cannot be determined based on present data), the method returns to block 610. If the timeout period has been determined to the desired level of accuracy, then the method proceeds to block 626. In one embodiment, the desired level of accuracy is plus or minus 2 seconds. Alternatively, other levels of accuracy such as plus or minus 1 second, plus or minus 0.2 seconds, plus or minus 1 minute, and so forth may be used.

At block 626, processing logic sets one or more messaging frequencies based on the determined timeout period. In one embodiment a first messaging frequency for sending keep-alive messages is set. A keep-alive message is a message that does not cause a recipient to send a receipt confirmation or any other response. The first messaging frequency may be slightly less than the determined timeout period, with the accuracy of the determined timeout period being taken into account. For example, if the determined timeout period was 61 seconds plus or minus 1 second, then the first messaging frequency may be set to a message every 59 seconds.

In one embodiment, a second messaging frequency for sending probe messages is set. The second messaging frequency may be lower than the first messaging frequency. For example, the second messaging frequency may be one message every 10 minutes if the first messaging frequency is once every 60 seconds. The probe messages elicit a response message from the recipient, and can be used to determine if processing logic has a network connection and/or a server is still accessible.

At block 628, processing logic periodically sends messages (e.g., keep-alive messages and/or probe messages) according to the one or more messaging frequencies. By sending the messages according to the messaging frequency that is based on the determined timeout period, processing logic ensures that a firewall does not remove a flow that identifies a connection between the processing logic and the remote computing device. Thus, the remote computing device may send infrequent notifications to processing logic, and these infrequent notifications will not be dropped by the firewall.

FIG. 6B is a flow diagram of another embodiment for a method 630 of maintaining an open path to a remote computing device. At block 635 of method 630, processing logic sends one or more UDP request messages to a remote computing device, each of which may indicate that a response message should be returned after a specified delay. At block 640, processing logic determines whether any response messages have been received. The response messages may include receipt confirmation messages and/or response messages received after a specified delay. If no response messages have been received, the method continues to block 645. Otherwise, the method proceeds to block 660.

At block 645, processing logic sends one or more TCP request messages to the remote computing device. The TCP request messages may be similar to the UDP request messages, but may be sent using the TCP protocol rather than the UDP protocol.

At block 650, processing logic determines whether any response messages to the TCP request messages have been received. If no response messages are received, then the method proceeds to block 655, and processing logic determines that there is no network connectivity and/or that the remote computing device is unreachable. If response messages are received, the method continues to block 660.

At block 660, processing logic determines or estimates a timeout period based on response messages to the UDP request messages and/or the TCP request messages. At block 665, processing logic sets a messaging frequency based on the determined timeout period. At block 670, processing logic periodically sends messages (e.g., keep-alive messages and/or probe messages) according to the messaging frequency.

Figure 7:
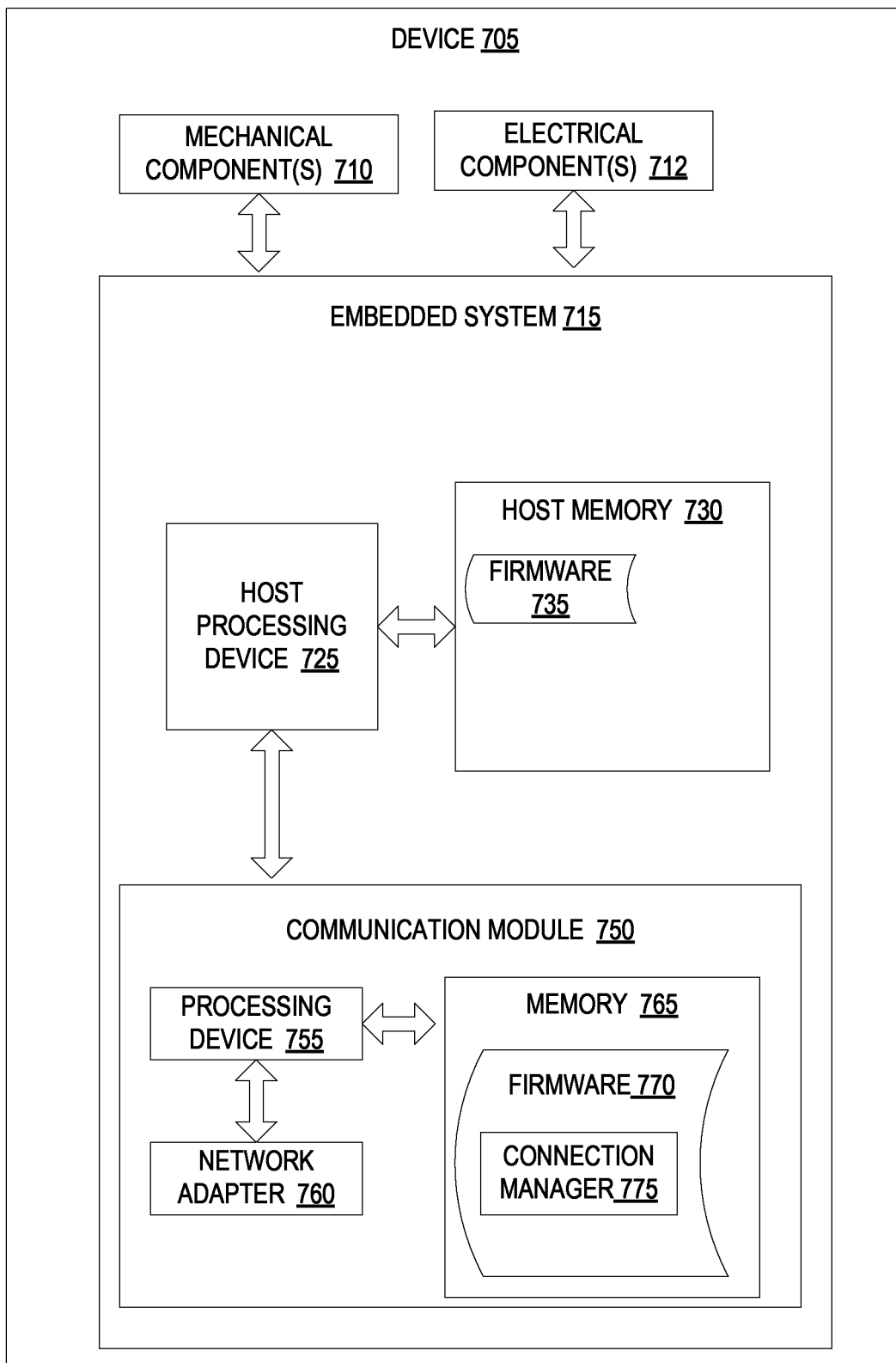
FIG. 7 is a block diagram of an example device having a remotely accessible embedded system.

FIG. 7 is a block diagram of an example device 705 having a remotely accessible embedded system 715. The device 705 may include, for example, electrical appliances such as refrigerators, ovens, washers, driers, dishwashers, thermostats, alarms, air conditioners, televisions, radios, receivers, amplifiers, and so forth. The device 705 may also include consumer devices such as digital watches, music players, game consoles, digital cameras, printers, and so forth. Other examples of devices include stationary devices such as HVAC systems, traffic lights, factory controllers, signs, electronic billboards, sprinkler systems, and irrigation control systems, as well as medical devices. Device 705 may also be any other type of device that includes an embedded system.

In one embodiment, the device 705 includes mechanical components 710, electrical components 712 and an embedded system 715. The electrical components 712 and/or mechanical components 710 may include sensors, programmable logic controllers (PLCs), switches, motors, valves, actuators, and so forth.

The embedded system 715 may include a host processing device 725, a host memory 730 and/or a communication module 750 coupled to the host processing device 725. The embedded system 715 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 725 may be a microcontroller or a digital signal processor (DSP) in one embodiment. Host processing device 725 may alternatively or additionally include a programmable logic controller (PLC), a field programmable gate array (FPGA) or a complex programmable logic device (CPLD). The host processing device 725 may be configured to perform specific functions related to the operation and control of the device 705.

Host memory 730 may include random access memory (RAM), read only memory (ROM), one time programmable (OTP) ROM, Flash (e.g., NOR Flash), or other types of memory. Host memory 730 may store firmware 735 for performing operations such as controlling the electrical components 712. The firmware 735 may include an application programming interface (API) for the communication module 750. The API may enable the host processing device 725 to send commands and/or data to and receive commands and/or data from communication module 750. Firmware 735 and/or software for the host processing device 725 may configure the host processing device to perform one or more operations that are specific to device 705. For example, host memory 730 may include an executable that has been generated in accordance with embodiments of the present invention, as described above. In some embodiments, the host memory 730 may be integrated into the host processing device 725. For example, microcontrollers typically include a processor core, memory and programmable input/output peripherals. Accordingly, if the host processing device 725 is a microcontroller, then host memory 730 may be a memory of host processing device 725.

Communication module 750 may be an integrated circuit (IC) that is configured to be coupled to host processing device 725 of embedded system 715. Communication module 750 may be provided by a third party to a manufacturer of the device along with the API, and may enable network capability and remote control capability to be easily added to the device 705. In one embodiment, communication module 750 is configured to communicate using the notification protocol described in embodiments herein. For example, a memory 765 of communication module 750 may include firmware 770 and/or software that includes instructions for a connection manager 775, which may correspond to connection manager 150 of FIG. 1A.

The communication module 750 may include its own processing device 755, a memory 765 and/or a network adapter 760. The processing device 755 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 765 is integrated into processing device 755. Memory 765 may store firmware 770 and/or software for execution by the processing device 755, such as an executable that has been generated in accordance with embodiments of the present invention as described above.

Network adapter 755 may be a wired network adapter (e.g., an Ethernet adapter) or a wireless network adapter (e.g., a Wi-Fi adapter or other wireless local area network (WLAN) adapter). Network adapter 760 may also be configured to provide connection to a network or other devices using Zigbee, PLC, Bluetooth, 6LowPAN, or other communication protocols. Network adapter 760 may also be a wireless modem configured to communicate with a wireless carrier network using GSM, CDMA, UMTS, LTE, WiMAX, or any other 2G, 3G, 4G or other wireless telephone technology. Network adapter 760 may receive notifications and other messages from a WAN accessible service and/or remote control applications. Network adapter 760 may additional send outgoing messages to the WAN accessible service and/or to remote control applications.

Figure 8:
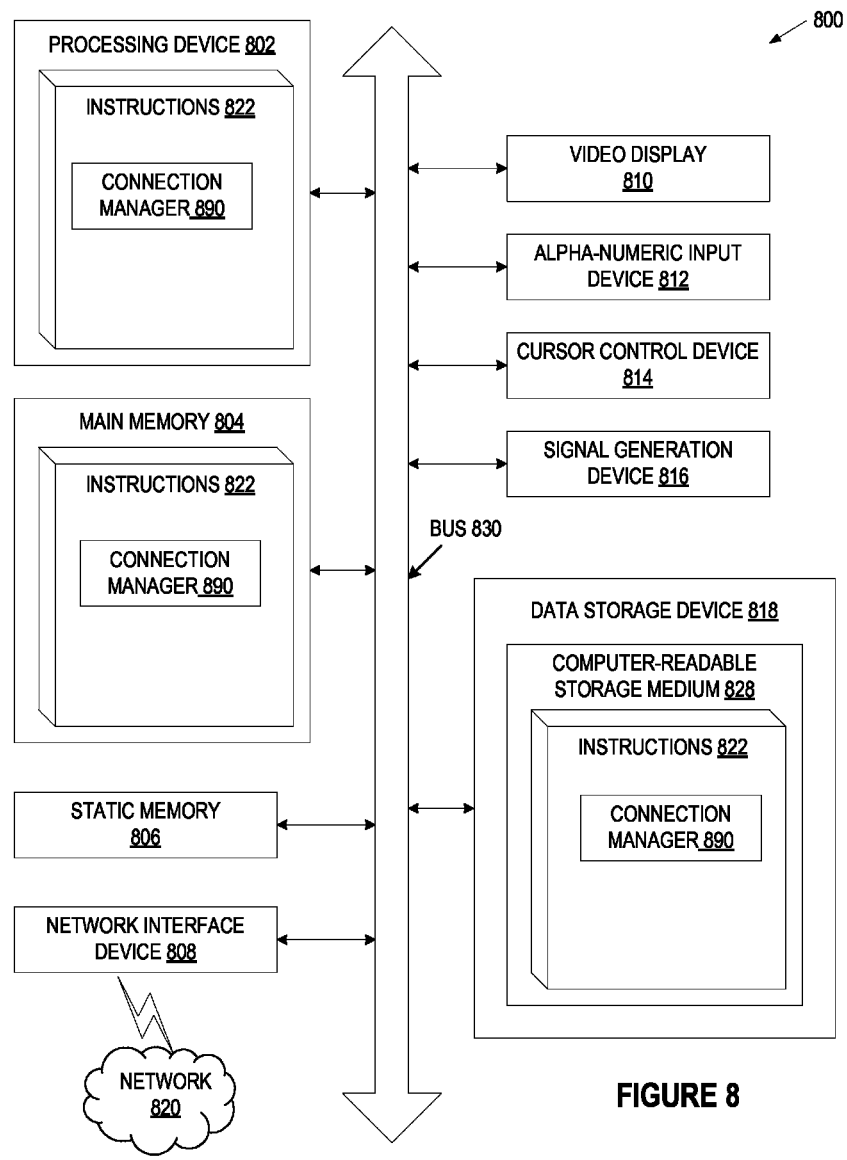
FIG. 8 illustrates a diagrammatic representation of a machine in the example form of a computing device within which a set of instructions, for causing the machine to perform any one or more of the methodologies discussed herein, may be executed.

FIG. 8 illustrates a diagrammatic representation of a machine in the example form of a computing device 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store a module that uses the notification protocol as described in embodiments, and/or a software library containing methods that call such a module. For example, instructions 822 may include instructions for a connection manager 890, which may correspond to connection manager 150 of FIG. 1A. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media other than carrier waves.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "performing", "determining", "setting", "communicating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read only memories (EPROMs), electrically erasable programmable read only memories (EEPROMs), magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   sending, by a first computing device that is behind a firewall, a first request message to a first port of a second computing device that is outside the firewall, wherein the first port is associated with a first flow of a plurality of concurrent flows between the first computing device and the second computing device, and wherein the first request message comprises a request for the second computing device to send a first response message to the first computing device after a specified first time period;
   sending, by the first computing device, a second request message to a second port of the second computing device that is associated with a second flow of the plurality of concurrent flows, the second request message comprising a request for the second computing device to send a second response message to the first computing device after a specified second time period that is greater than the specified first time period; and
   responsive to receiving the first response message and failing to receive the second response message, performing the following comprising:
      determining that a timeout period of the firewall is greater than the specified first time period and less than the specified second time period, wherein the

19 failure to receive the second response message indicates that the second flow is terminated;
keeping the first flow active by performing at least one of sending an additional message to the first port of the second computing device or receiving the additional message from the first port of the second computing device within the specified first time period to prevent the firewall from blocking future messages from the second computing device;
determining a third time period that is greater than the specified first time period and less than the specified second time period; and
sending a third request message to the second port, the third request message comprising a request for the second computing device to send a third response message to the first computing device after the third time period.

2. The method of claim 1, wherein the first request message, the first response message, the second request message, the second response message, the third request message and the additional message are user datagram protocol (UDP) messages, and wherein the timeout period of the firewall is a timeout period for a UDP flow.

3. The method of claim 2, further comprising performing the following responsive to a failure to receive the first response message and a failure to receive the second response message:
sending a fourth request message to the second computing device, the fourth request message comprising a request for the second computing device to send a fourth response message to the first computing device after the specified first time period, the specified second time period or a specified fourth time period, wherein the fourth request message and the fourth response message are transmission control protocol (TCP) messages; and
responsive to receiving the fourth response message, determining that an alternative timeout period of the firewall is less than or equal to the specified first time period, the specified second time period or the specified fourth time period.

4. The method of claim 1, further comprising performing the following responsive to receiving the first response message and receiving the second response message:
determining that the timeout period of the firewall is greater than the specified second time period;
keeping the first flow active by performing at least one of sending the additional message to the first port of the second computing device or receiving the additional message from the first port of the second computing device within the specified second time period to prevent the firewall from blocking future messages from the second computing device;
determining a fourth time period that is greater than the specified second time period; and
sending a fourth request message to the second port or a third port of the second computing device, the fourth request message comprising a request for the second computing device to send a fourth response message to the first computing device after the fourth time period.

5. The method of claim 1, further comprising:
responsive to receiving the first response message and failing to receive the second response message, setting a first messaging frequency based at least in part on the specified first time period, wherein the first computing device sends keep-alive messages to the second computing device in accordance with the messaging frequency, and wherein the keep-alive messages do not call for responses.

6. The method of claim 5, further comprising:
setting a second messaging frequency that is less frequent than the first messaging frequency, wherein the first computing device sends probe messages to the second computing device in accordance with the second messaging frequency, and wherein the probe messages call for responses.

7. The method of claim 1, wherein the first computing device comprises an embedded system and the second computing device comprises a server computing device that provides a service to the embedded system.

8. A non-transitory computer readable storage medium having instructions that, when executed by a processing device of a first computing device, cause the processing device to perform operations comprising:
sending, by the processing device, a first request message to a first port of a second computing device that is outside a firewall associated with the first computing device, wherein the first port is associated with a first flow of a plurality of concurrent flows between the first computing device and the second computing device, and wherein the first request message comprises a request for the second computing device to send a first response message to the first computing device after a specified first time period;
sending, by the processing device, a second request message to a second port of the second computing device that is associated with a second flow of the plurality of concurrent flows, the second request message comprising a request for the second computing device to send a second response message to the first computing device after a specified second time period that is greater than the specified first time period; and
responsive to receiving the first response message and failing to receive the second response message, performing the following comprising:
determining that a timeout period of the firewall is greater than the specified first time period and less than the specified second time period, wherein the failure to receive the second response message indicates that the second flow is terminated;
keeping the first flow active by performing at least one of sending an additional message to the first port of the second computing device or receiving the additional message from the first port of the second computing device within the specified first time period to prevent the firewall from blocking future messages from the second computing device;
determining a third time period that is greater than the specified first time period and less than the specified second time period; and
sending a third request message to the second port, the third request message comprising a request for the second computing device to send a third response message to the first computing device after the third time period.

9. The non-transitory computer readable storage medium of claim 8, wherein the first request message, the first response message, the second request message, the second response message, the third request message and the additional message are user datagram protocol (UDP) messages, and wherein the timeout period of the firewall is a timeout period for a UDP flow.

10. The non-transitory computer readable storage medium of claim 9, the operations further comprising performing the following responsive to a failure to receive the first response message and a failure to receive the second response message:
sending a fourth request message to the second computing device, the fourth request message comprising a request for the second computing device to send a fourth response message to the first computing device after the specified first time period, the specified second time period or a specified fourth time period, wherein the fourth request message and the fourth response message are transmission control protocol (TCP) messages; and
responsive to receiving the fourth response message, determining that an alternative timeout period of the firewall is less than or equal to the specified first time period, the specified second time period or the specified fourth time period.

11. The non-transitory computer readable storage medium of claim 8, the operations further comprising:
responsive to receiving the first response message and failing to receive the second response message, setting a first messaging frequency based at least in part on the specified first time period, wherein the processing device sends keep-alive messages to the second computing device in accordance with the messaging frequency, and wherein the keep-alive messages do not call for responses; and
setting a second messaging frequency that is less frequent than the first messaging frequency, wherein the processing device sends probe messages to the second computing device in accordance with the second messaging frequency, and wherein the probe messages call for responses.

12. The non-transitory computer readable storage medium of claim 8, wherein the first computing device comprises an embedded system and the second computing device comprises a server computing device that provides a service to the embedded system.

13. A client computing device comprising:
a memory; and
a processing device coupled to the memory, wherein the processing device is to:
send a first request message to a first port of a second computing device, wherein the first port is associated with a first flow of a plurality of concurrent flows between the client computing device and the second computing device, and wherein the first request message comprises a request for the second computing device to send a first response message to the client computing device after a specified first time period;
send a second request message to a second port of the second computing device that is associated with a second flow of the plurality of concurrent flows, the second request message comprising a request for the second computing device to send a second response message to the client computing device after a specified second time period that is greater than the specified first time period; and
responsive to receiving the first response message and failing to receive the second response message, perform the following comprising:
determine that a timeout period of a firewall interposed between the client computing device and the second computing device is greater than the specified first time period and less than the specified second time period, wherein the failure to receive the second response message indicates that the second flow is terminated;
keep the first flow active by periodically sending an additional message to the first port of the second computing device within the specified first time period to prevent the firewall from blocking future messages from the second computing device;
determine a third time period that is greater than the specified first time period and less than the specified second time period; and
send a third request message to the second port, the third request message comprising a request for the second computing device to send a third response message to the first computing device after the third time period.

14. The client computing device of claim 13, wherein the client computing device comprises an embedded system and the second computing device comprises a server computing device that provides a service to the embedded system.

15. The method of claim 1, wherein the specified first time period is known to be lower than the timeout period of the firewall.

16. The non-transitory computer readable storage medium of claim 8, the operations further comprising performing the following responsive to receiving the first response message and receiving the second response message:
determining that the timeout period of the firewall is greater than the specified second time period;
keeping the first flow active by performing at least one of sending the additional message to the first port of the second computing device or receiving the additional message from the first port of the second computing device within the specified second time period to prevent the firewall from blocking future messages from the second computing device;
determining a fourth time period that is greater than the specified second time period; and
sending a fourth request message to the second port or a third port of the second computing device, the fourth request message comprising a request for the second computing device to send a fourth response message to the first computing device after the fourth time period.

17. The non-transitory computer readable storage medium of claim 8, wherein the specified first time period is known to be lower than the timeout period of the firewall.

18. The client computing device of claim 13, wherein the first request message, the first response message, the second request message, the second response message, the third request message and the additional message are user datagram protocol (UDP) messages, and wherein the timeout period of the firewall is a timeout period for a UDP flow.

19. The client computing device of claim 18, wherein the processing device is further to perform the following responsive to a failure to receive the first response message and a failure to receive the second response message:
send a fourth request message to the second computing device, the fourth request message comprising a request for the second computing device to send a fourth response message to the first computing device after the specified first time period, the specified second time period or a specified fourth time period, wherein the fourth request message and the fourth response message are transmission control protocol (TCP) messages; and responsive to receiving the fourth response message, determine that an alternative timeout period of the firewall is less than or equal to the specified first time period, the specified second time period or the specified fourth time period.

20. The client computing device of claim 13, wherein the processing device is further to perform the following responsive to receiving the first response message and receiving the second response message:

determine that the timeout period of the firewall is greater than the specified second time period;

keep the first flow active by performing at least one of sending the additional message to the first port of the second computing device or receiving the additional message from the first port of the second computing device within the specified second time period to prevent the firewall from blocking future messages from the second computing device;

determine a fourth time period that is greater than the specified second time period; and send a fourth request message to the second port or a third port of the second computing device, the fourth request message comprising a request for the second computing device to send a fourth response message to the first computing device after the fourth time period.

\* \* \* \* \*